US008855184B2

(12) United States Patent
Suh et al.

(10) Patent No.: US 8,855,184 B2
(45) Date of Patent: Oct. 7, 2014

(54) SYSTEM AND METHOD FOR NON-INTERLEAVED SIGNAL FIELD

(71) Applicant: FutureWei Technologies, Inc., Plano, TX (US)

(72) Inventors: Junghoon Suh, Kanata (CA); Kwok Shum Au, Shenzhen (CN); Osama Aboul-Magd, Kanata (CA); Tianyu Wu, Ma On Shan (HK)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 13/739,949

(22) Filed: Jan. 11, 2013

(65) Prior Publication Data

US 2013/0195167 A1    Aug. 1, 2013

Related U.S. Application Data

(60) Provisional application No. 61/591,620, filed on Jan. 27, 2012.

(51) Int. Cl.
H03H 7/40 (2006.01)
A47D 5/00 (2006.01)
A47D 13/00 (2006.01)
A47D 13/08 (2006.01)
H04L 27/01 (2006.01)

(52) U.S. Cl.
CPC .............. *A47D 13/00* (2013.01); *A47D 15/033* (2013.01); *A47D 5/006* (2013.01); *A47D 13/08* (2013.01); *H04L 27/01* (2013.01)
USPC ........................................ 375/231

(58) Field of Classification Search
USPC .......................... 375/231, 295, 229
See application file for complete search history.

(56) References Cited

U.S. PATENT DOCUMENTS

| | | | |
|---|---|---|---|
| 2005/0013274 A1* | 1/2005 | Pekonen et al. | 370/329 |
| 2009/0006928 A1* | 1/2009 | Chou et al. | 714/762 |
| 2010/0218066 A1 | 8/2010 | Okamura et al. | |
| 2010/0254446 A1* | 10/2010 | Khayrallah et al. | 375/232 |
| 2011/0013607 A1* | 1/2011 | Van Nee et al. | 370/338 |
| 2011/0051705 A1 | 3/2011 | Jones, IV et al. | |
| 2011/0305296 A1* | 12/2011 | Van Nee | 375/295 |

OTHER PUBLICATIONS

"IEEE Draft Standard for Information Technology—Telecommunications and information exchange between systems—Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz," IEEE P802.11ac™/D2.0, Prepared by the 802.11 Working Group of the 802 Committee, Jan. 2012, 359 pages.
Porat, R., et al., "32FFT Interleaver", IEEE 802.11-12/0113r0, Power Point presentation submitted Jan. 16, 2012, 13 slides.

(Continued)

*Primary Examiner* — Khai Tran
(74) *Attorney, Agent, or Firm* — Slater & Matsil, L.L.P.

(57) ABSTRACT

Efficient decoding in IEEE 802.11ah networks can be achieved by transmitting the signal (SIG) preamble field without interleaving bits within the SIG field. This may allow channel equalization and decoding steps to be performed contemporaneously upon reception of the frame, which allows for the implementation of non-linear channel equalization techniques (e.g., maximum likelihood (ML) equalization, etc.

22 Claims, 8 Drawing Sheets

(56) References Cited

OTHER PUBLICATIONS

"IEEE Draft Standard for Information Technology—Telecommunications and information exchange between systems—Local and metropolitan area networks—Specific requirements, Part 11: Wireless LAN Medium Access Control (MAC) and Physical Layer (PHY) specifications," IEEE Std 802.11™—2012 (Revision of IEEE Std 802.11-2007), Mar. 29, 2012, 2793 pages.

"IEEE Draft Standard for Information Technology—Telecommunications and information exchange between systems—Local and metropolitan area networks—Specific requirements, Part 11: Wireless LAN Medium Access Control (MAC) and Physical Layer (PHY) Specifications," Prepared by the 802.11 Working Group of the LAN/MAN Standards Committee of the IEEE Computer Society, IEEE Draft P802.11-REVmb™/D12, Nov. 2011, 2910 pages.

Park, M., "IEEE P802.11 Wireless LANs Proposed Specification Framework for TGah," IEEE 802.11-12/1406r0, 51 pages, Nov. 2012.

International Search Report and Written Opinion received in International Application No. PCT/US2013/023485 mailed Apr. 9, 2013, 10 pages.

* cited by examiner

SYSTEM AND METHOD FOR NON-INTERLEAVED SIGNAL FIELD

This application claims the benefit of U.S. Provisional Application No. 61/591,620 filed on Jan. 27, 2012, entitled "System and Method for Non-Interleaved Signal Field," which is incorporated herein by reference as if reproduced in its entirety.

TECHNICAL FIELD

The present invention relates to a system and method for wireless communications, and, in particular embodiments, to a system and method for non-interleaved signal field.

BACKGROUND

Institute of Electrical and Electronics Engineers (IEEE) standards publications 802.11 outline protocols for implementing wireless local area networks (WLAN). IEEE 802.11 sets forth a physical (PHY) layer frame format that includes a preamble composed of three fields, namely, a short training field (STF), a long training field (LTF), and a signal (SIG) field. The STF is used for packet detection, automatic gain control (AGC), and coarse synchronization, the LTF is used for channel estimation and fine synchronization, and the SIG field specifies parameters of the frame (e.g., frame rate, frame length, etc.). IEEE 802.11ac (2012) is a communication standard for providing high-throughput in wireless local area networks (LANs), and is incorporated herein by reference as if reproduced in its entirety.

Channel equalization is performed to remove distortions from a received frame, and relies on the accurate channel estimation. The channel estimation is performed to estimate conditions of the air channel, and relies on analyzing the received LTF. In IEEE 802.11ac networks, the SIG field is typically interleaved prior to transmission, while the LTF/STF preamble fields are typically transmitted without interleaving. Non-linear channel equalization technique must generally be performed concurrently with channel decoding, whereas the conventional IEEE 802.11 networks are typically limited to linear equalization (e.g., zero-forcing equalization), which may generally be less effective at removing distortion from the signal than non-linear channel equalization techniques (e.g., maximum likelihood equalization, etc.).

IEEE standards publication 802.11ah is a planned derivative of IEEE 802.11ac that is expected to be released in 2015, and will be specifically tailored for sensor network, data off-loading, and smart metering applications. While IEEE 802.11ah will share many similarities with IEEE 802.11ac, modifications to various IEEE 802.11ac protocols are desired to allow IEEE 802.11ah networks to better serve sensor networks, data-offloading, and smart metering applications.

SUMMARY OF THE INVENTION

Technical advantages are generally achieved, by embodiments of this disclosure which describe a system and method for non-interleaved signal field.

In accordance with an embodiment, a method of transmitting a wireless signal is provided. In this example, the method includes encoding data into a signal (SIG) field to obtain an encoded SIG field; and transmitting the encoded SIG field without interleaving bits within the encoded SIG field. An apparatus for performing this method is also provided.

In accordance with another embodiment, a method of receiving a wireless signal is provided. In this example, the method includes receiving a frame comprising an encoded SIG field, and performing channel equalization without de-interleaving the encoded SIG field. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently disclosed embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Aspects of this disclosure provide efficient decoding in IEEE 802.11ah networks by transmitting the SIG preamble field without interleaving, thereby allowing the channel equalization and decoding steps to be performed contemporaneously upon reception of the frame. As a result, receivers may implement non-linear channel equalization techniques (e.g., ML equalization, etc.), thereby efficiently removing higher amounts of distortion from the frame and achieving lower bit error rates.

Figure 1:
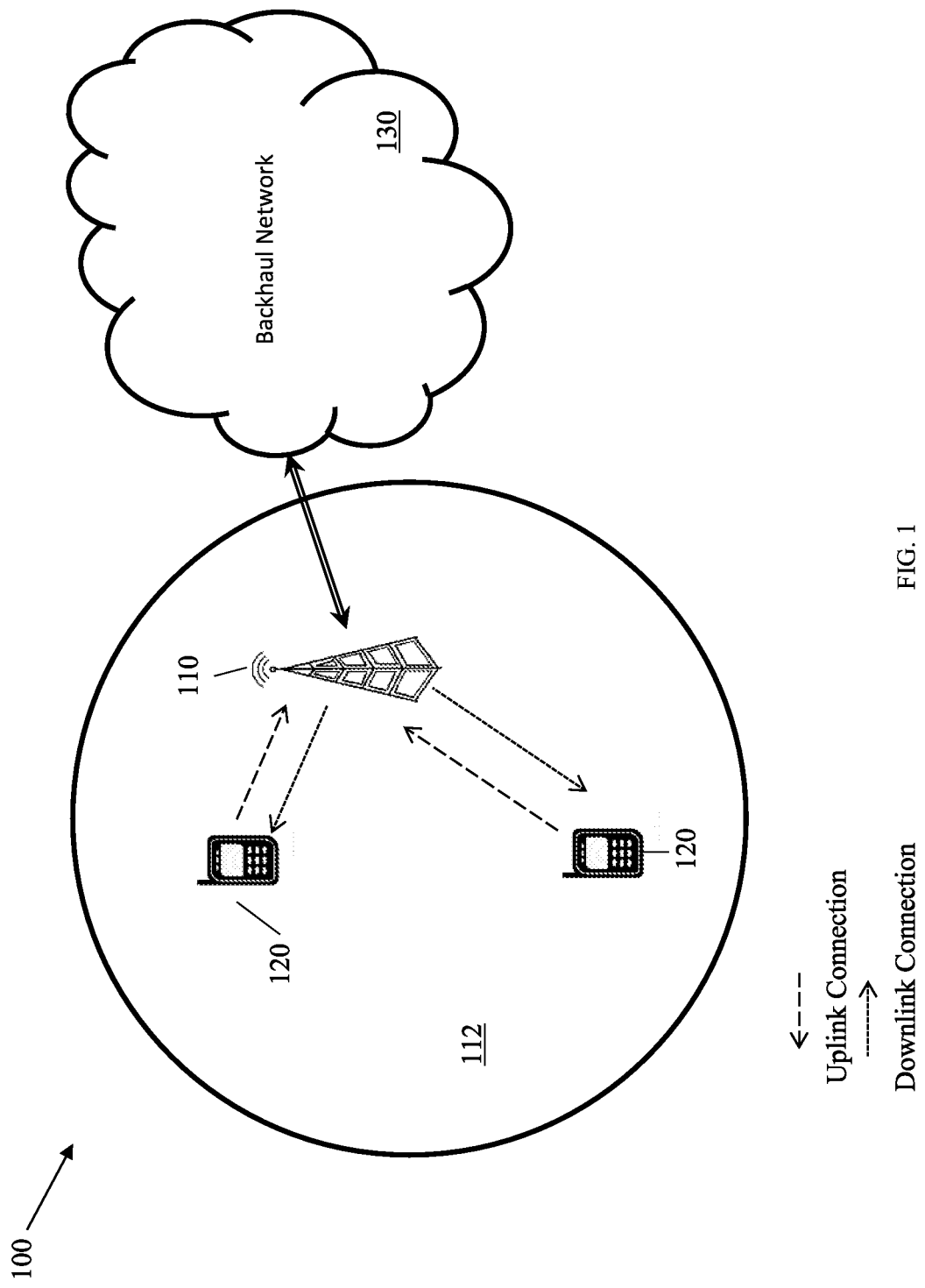
FIG. 1 illustrates diagram of a wireless network for communicating data.

FIG. 1 illustrates a network 100 for communicating data. The network 100 comprises an access point (AP) 110 having a coverage area 112, a plurality of stations (STAs) 120, and a backhaul network 130. The AP 110 may comprise any component capable of providing wireless access by, inter alia, establishing uplink (dashed line) and/or downlink (dotted line) connections with the STAs 120, such as a base station, an enhanced base station (eNB), a femtocell, or other wirelessly enabled devices. The STAs 120 may comprise any component capable of establishing a wireless connection with the AP 110. The backhaul network 130 may be any component or collection of components that allow data to be exchanged between the AP 110 and a remote end (not shown). In some embodiments, the network 100 may comprise various other wireless devices, such as relays, femtocells, etc.

Figure 2:
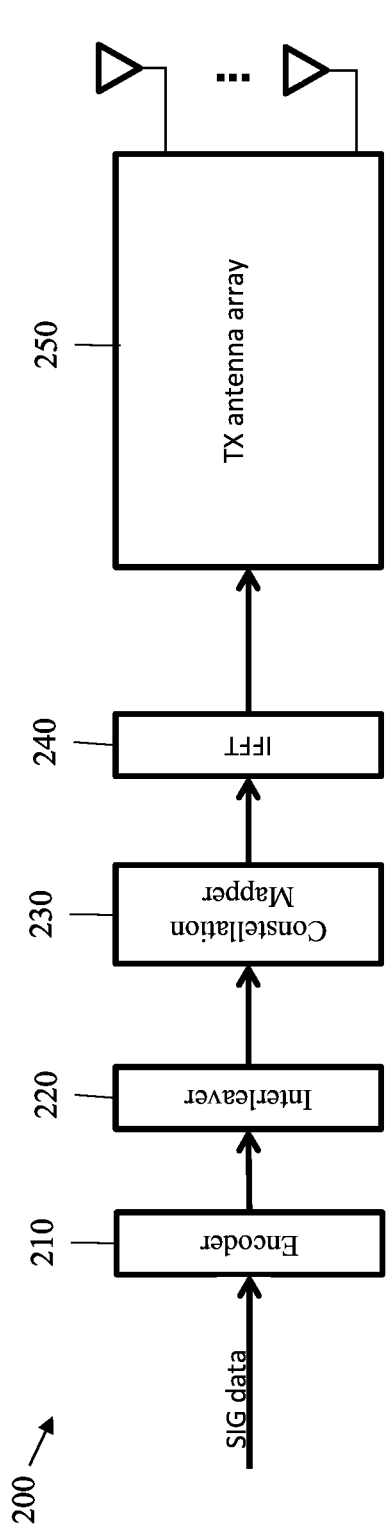
FIG. 2 illustrates a diagram of a conventional transmitter (TX) SIG design flow.

FIG. 2 illustrates a conventional SIG transmitter 200 for transmitting SIG field of a preamble over a network. As shown, the SIG transmitter 200 comprises an encoder 210, an interleaver 220, a constellation mapper 230, an inverse fast Fourier transform (IFFT) module 240, and a transmission (TX) antenna array 250. The SIG transmitter 200 may encode the SIG data using the SIG encoder 210. The SIG encoder 210 may be any device configured to encode data, e.g., a binary convolutional code (BCC) encoder, etc. The SIG transmitter 200 may then interleave the encoded SIG data using the interleaver 220, thereby obtaining an interleaved data stream. Interleaving may include re-arranging bits in a data stream prior to transmission, and may typically be used to achieve improved spatial and/or frequency diversity in a transmission signal. The interleaver 220 may be a data interleaver in accordance with IEEE standards publication 802.11n, which is incorporated by reference herein as if reproduced in its entirety. The SIG transmitter 200 may then map the data stream (e.g., binary data) to a higher order data stream (e.g., a multi-bit data stream) using the constellation mapper 230. Mapping of the binary data stream to a higher order data stream may be achieved by manipulating (changing) the phase and/or amplitude of the baseband signal. Thereafter, the SIG transmitter 200 may modulate the data stream using the IFFT module 240 to obtain a modulated signal, and then wirelessly transmit the modulated signal over the network via the TX antenna array 250.

Figure 3:
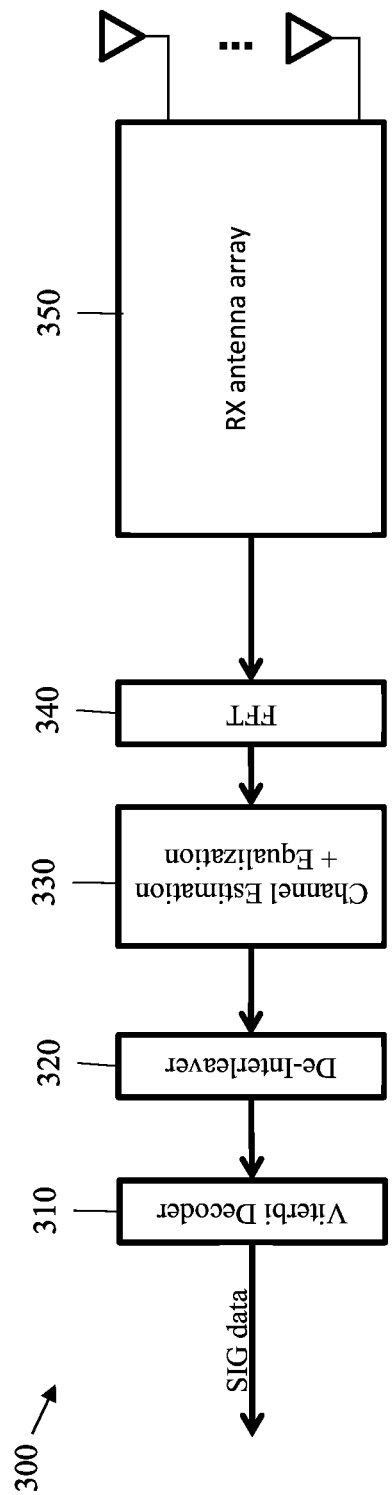
FIG. 3 illustrates a diagram of a conventional receiver (RX) SIG design flow.

FIG. 3 illustrates a conventional SIG receiver 300 for receiving a SIG field transmission. As shown, the SIG receiver 300 comprises a Viterbi decoder 310, a de-interleaver 320, a channel estimation module 330, a fast Fourier transform (FFT) module 340, and a receiver (RX) antenna array 350. The SIG receiver 300 may receive an RF signal via the RX antenna array 350. Thereafter, the SIG receiver 300 may demodulate the RF signal using the FFT module 340. Next, the SIG receiver 300 may perform channel estimation and equalization using the channel estimation module 330. Channel estimation may include analyzing the demodulated signal to obtain channel state information (CSI), while equalization may include removing distortion from the demodulated signal. Thereafter, the SIG receiver 300 may re-arrange bits of signal using the de-interleaver 320 so that the original sequence of bits may be obtained. Finally, the SIG receiver 300 may decode the de-interleaved signal using the Viterbi decoder 310 to obtain the SIG data. In some embodiments, a Quadrature amplitude modulation (QAM) size, QPSK or below, the real and imaginary parts of the data after taking the channel equalization may already be in the form of soft bit information, which enables the receiver to bypass the constellation demapper including the likelihood ratio computation. This soft bit information shall be forwarded to the Viterbi decoder 310.

Notably, the conventional SIG receiver 300 may be limited to linear channel equalization techniques because channel equalization is performed prior to Viterbi decoding. Aspects of this disclosure provide techniques/mechanisms that allow channel equalization to be performed simultaneously with Viterbi decoding, which allows for implementation of superior non-linear channel equalization techniques, e.g., ML equalization, etc.

Figure 4:
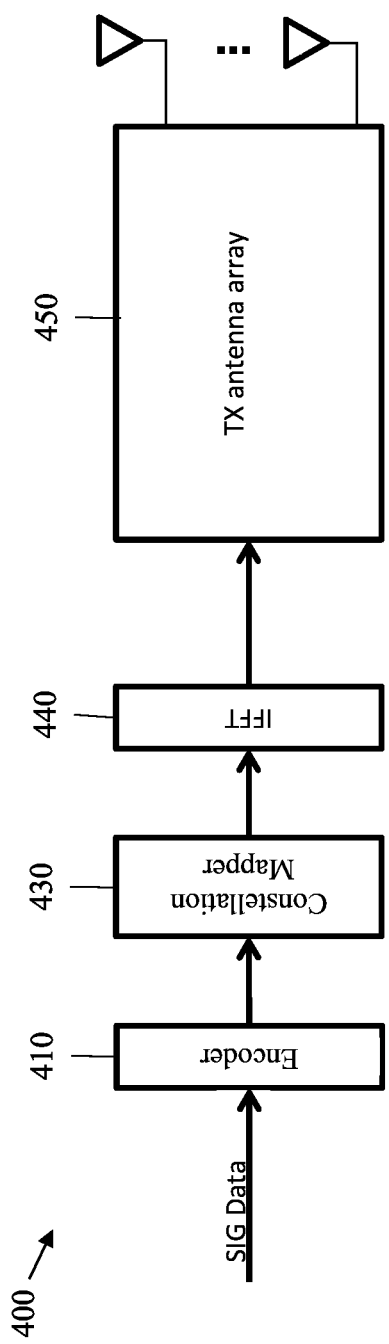
FIG. 4 illustrates a diagram of an embodiment TX SIG design flow.

FIG. 4 illustrates an embodiment SIG transmitter 400 for transmitting SIG field over a network. As shown, the SIG transmitter 400 comprises an encoder 410, a constellation mapper 430, an inverse fast Fourier transform (IFFT) module 440, and a TX antenna array 450. The SIG transmitter 400 may perform signal encoding, mapping, modulation, and transmission using the components 410-450 in a manner similar to the conventional SIG transmitter 200 (described above). However, unlike the conventional SIG transmitter 200, the SIG transmitter 400 may omit the interleaving step, thereby transmitting the RF signal without re-arranging bits in the encoded SIG data stream. The omission of the interleaving step by the SIG transmitter 400 may allow for non-linear channel equalization upon reception of the RF signal.

Figure 5:
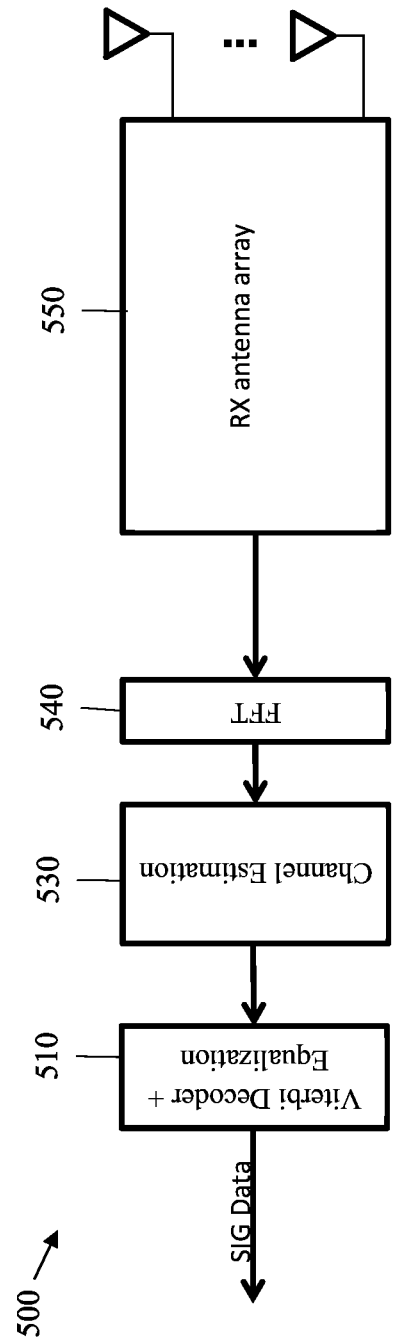
FIG. 5 illustrates a diagram of an embodiment RX SIG design flow.

FIG. 5 illustrates an embodiment SIG receiver 500 for receiving a SIG field transmission. As shown, the SIG transmitter 500 comprises a Viterbi decoder 510, a channel estimation module 530, an FFT module 540, and an RX antenna array 550. The SIG receiver 500 may receive and demodulate an RF signal using the RX antenna array 550, and thereafter perform a FFT operation on the signal using the FFT module 540. Thereafter, the SIG receiver 500 may perform channel estimation on the demodulated signal using the channel estimation module 530. Thereafter, the SIG receiver 500 decodes the data signal using the Viterbi decoder 510. Notably, the SIG receiver 500 performs channel equalization while decoding the data signal, which allows for implementation of non-linear channel equalization techniques, e.g., ML equalization, etc. The raw data of real & imaginary parts after the Fast Fourier Transform (FFT) module carries the soft output information, and the constellation de-mapper (likelihood ratio computation) does not have to be done before the Viterbi decoder, in case of QAM size QPSK and below. To wit, the raw data together with the channel parameters after channel estimation can be fed into the Viterbi decoder 510, and both channel equalization and the QAM de-mapping hard decision are performed together. The Viterbi decoder can make a QAM hard decision. For each corresponding bit of a QAM symbol, soft information may be forwarded to the Viterbi decoder 510. The soft information may include the bit information of QAM sizes, binary phase shift keying (BPSK) or quadrature phase-shift keying (QPSK), and the raw data out of the FFT module 540.

In some embodiments, the Viterbi decoder 510 may multiply the raw data by fading channels as well as compensate for additive white Gaussian noise (AWGN). In the prior art, the fading channel is supposed to be annihilated by the channel equalizer before being passed over to the channel decoder when an interleaver function block was used to generate SIG field, because the fading channel parameters could not be de-interleaved in the receiver together with the raw received signal. The channel parameters are estimated through the LTFs, and in the prior art the LTFs were not interleaved, unlike the SIG. If an interleaver is not used for both SIG and LTFs, the raw data together with the estimated channel parameters may be passed directly to the Viterbi decoder, which handles what both the fading channel and AWGN are inherent within the data.

The Viterbi Decoder with channel parameters may perform a branch metric computation on every branch at each trellis stage, where there are 64 states and 2 incoming branches per state at each trellis stage, where the calculation of Euclidean distance is based on $|r-hs|^2$, in case of QPSK, where r is the received signal at each stage, h is the estimated channels per each stage, and s is the original QPSK symbols on the trellis diagram at each stage and at each branch, and where for BPSK cases, the calculation of Euclidean distance is based on $\Sigma_i |r_i - h_s s_i|^2$, where i is 1 and 2, two consecutive encoded bits or BPSK symbol index.

Figure 6:
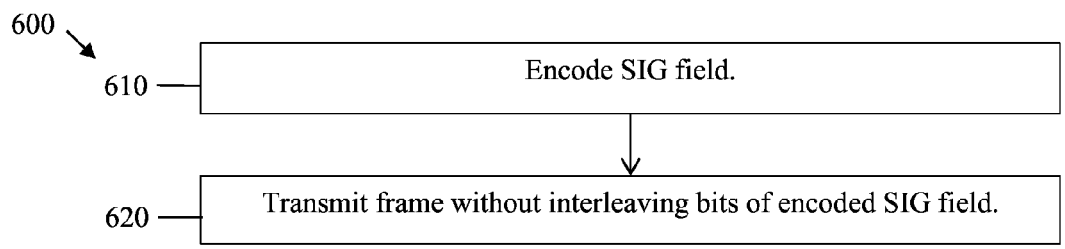
FIG. 6 illustrates a flowchart of an embodiment method for transmitting a SIG field.
Figure 7:
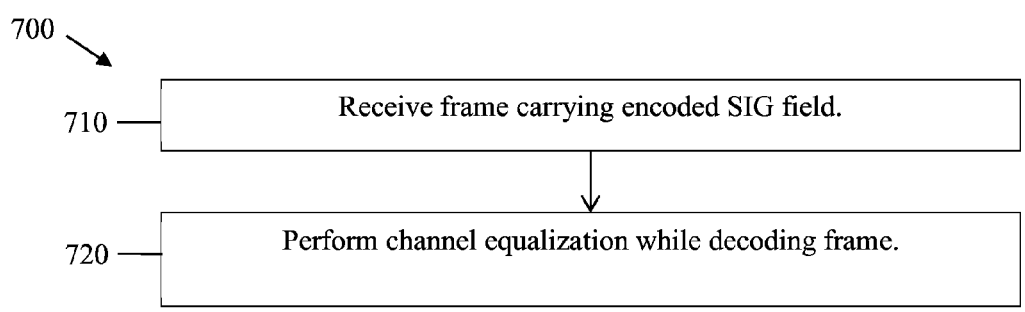
FIG. 7 illustrates a flowchart of an embodiment method for receiving a SIG field.

FIG. 6 illustrates a method 600 for communicating a SIG field in accordance with aspects of this disclosure, as might be performed by a transmitter. The method 600 begins at step 610, where the transmitter encodes SIG data to obtain an encoded SIG field. Thereafter, the method 600 proceeds to step 620, where the transmitter transmits frame without interleaving bits of the encoded SIG field. Notably, the SIG field is carried within the frame's preamble, which may also include various other fields, e.g., LTF, short training field (STF), etc. FIG. 7 illustrates a method 700 for receiving a SIG field in accordance with aspects of this disclosure, as might be performed by a receiver. The method 700 begins at step 710, where a frame carrying an encoded SIG field is received. Thereafter, the method 700 proceeds to step 720, where the receiver performs channel equalization while decoding the frame, e.g., equalization is performed contemporaneously with decoding of the frame.

An embodiment method and system removes the interleaver function block after the channel encoding process for SIG, so that the channel parameters estimated with the LTF can be passed into the channel decoder together with the received signal without being equalized. This provides a maximum likelihood (ML) type of equalization, which boosts the overall performance in the decoder. With the interleaver removed from the preamble TX flow, and the channel equalization combined in the Viterbi Decoder about a 2 dB performance gain can be achieved at the BER, $10^{-1}$ averaged over 10 STAs.

In an embodiment, the Interleaver in the TX flow is removed from the flow, and thus, the corresponding de-interleaver in the RX flow is removed as well. Because the SIG field is not interleaved, just like the LTF is not interleaved, the channel parameters estimated through the LTF do not have to be equalized before the Viterbi decoder, channel estimation may be combined with the decoder to improve overall performance. Channel decoding, channel equalization, and QAM demapping may be performed in one function block in the receiver. The channel equalizer is not processed independently of the Viterbi decoder, which makes the ML equalizer possible without increasing complexity. Performing channel equalization at the same time as decoding may reduce noise and provide enhanced energy efficiency. Channel equalization is performed contemporaneously with decoding such that raw data (e.g., where the fading channel component is inherent) is processed by the Viterbi decoder. In some embodiments, a 2 dB power efficiency improvement is achieved. Embodiments of this disclosure may be implemented in cellular networks, such as in base stations and mobile stations, and in Wi-Fi networks, such as in Wi-Fi access points (APs) and stations (STAs).

IEEE 802.11ah networks have smaller operational bandwidths than previous IEEE 802.11 networks, and as a result, burst errors may be somewhat rare. This characteristic of IEEE 802.11ah networks is explained by 802.11ah submission entitled "IEEE802.11-12/0113r0, 32 FFT Interleaver", Ron Porat et. al., January 2012, Jacksonville, which is incorporated by reference herein as if reproduced in its entirety.

Figure 8:
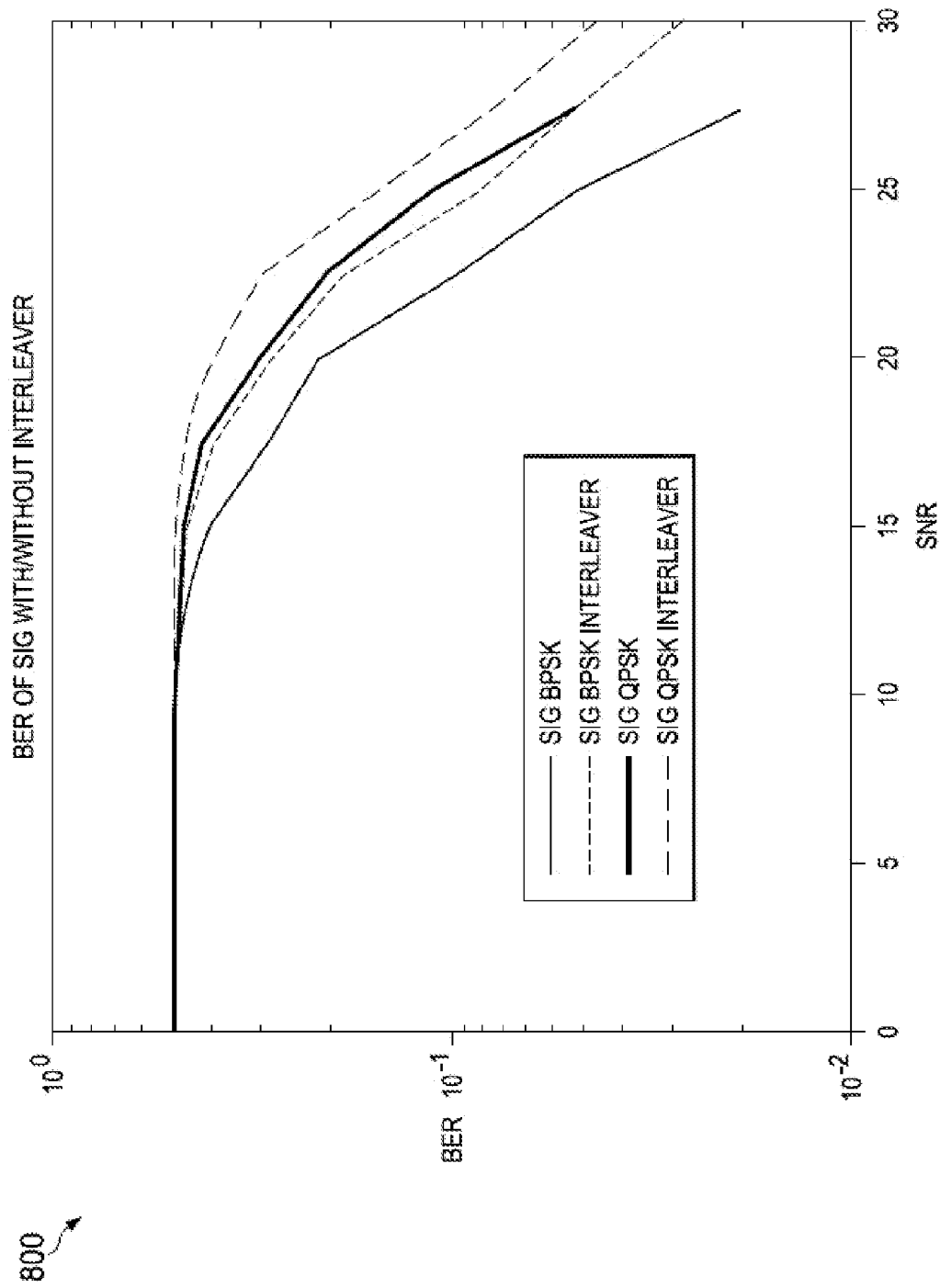
FIG. 8 illustrates a chart of simulation results.

When a linear equalizer such as a zero-forcing algorithm is used, the fading channel parameters can be annihilated but the noise level also gets increased, which causes the Viterbi decoder, which is an ML decoder, to combat AWGN channel to virtually lower the SNR level lower than the actual SNR. FIG. 8 illustrates simulation results with the following simulation environment: averaged BER over 10 STAs, 4TX in AP, fixed beamforming applied to all STAs based on one destination STA's feedback, no interleaver, 2RX per STA (4×2 channel is formed per STA), $1^{st}$ column of P matrix is applied to both LTF and SIG, one tab flat-fading channel is assumed, and perfect synchronization assumed. The SIG without the interleaver shows a 2 dB gain compared to the SIG with the interleaver. The QPSK SIG without the interleaver shows about the same BER as the BPSK SIG with the interleaver. The simulation results generally show that the interleaver is not needed for SIG design, and that the size of the SIG field can be doubled with the QPSK.

Figure 9:
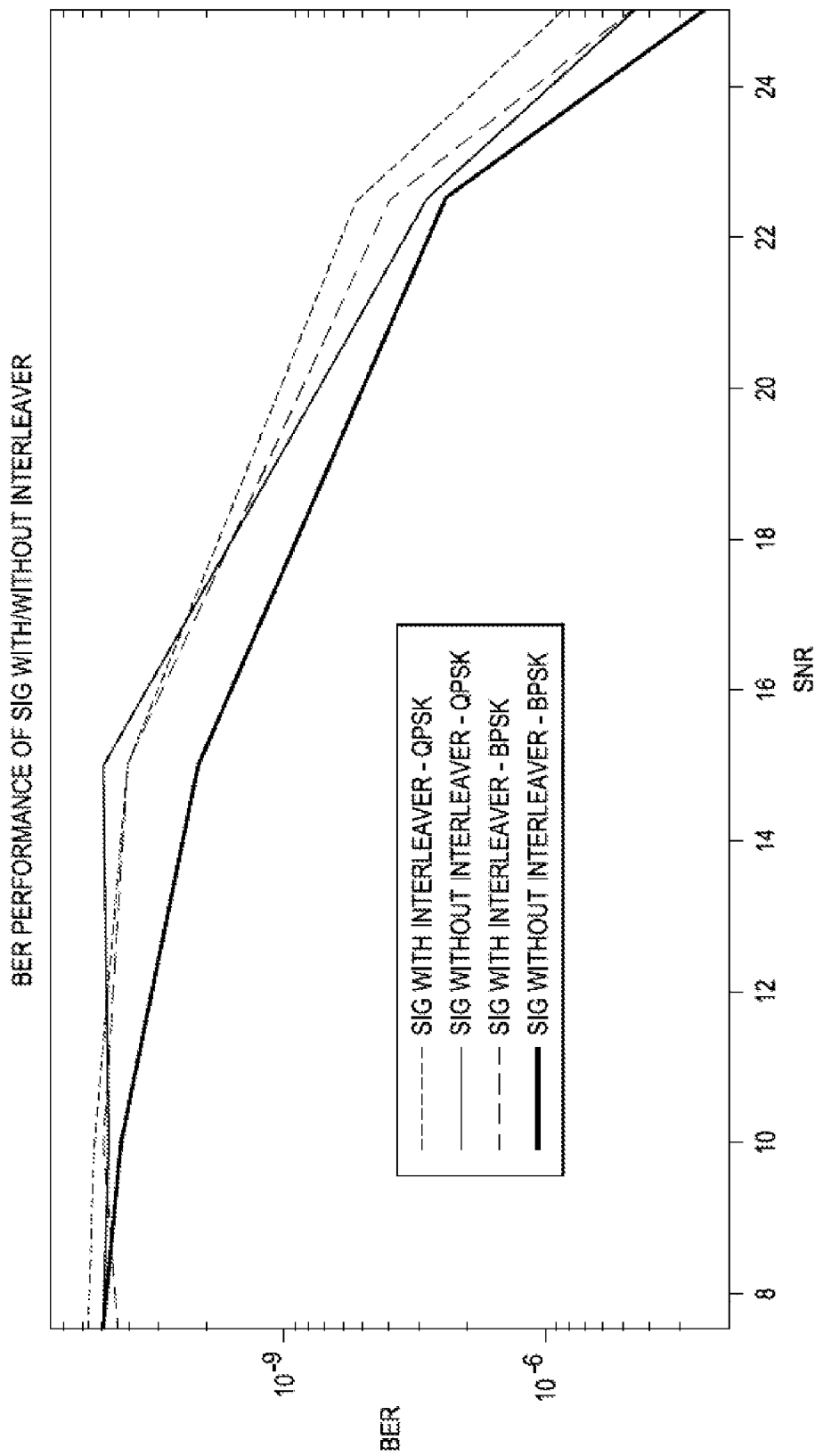
FIG. 9 illustrates a chart of additional simulation results.
Figure 10:
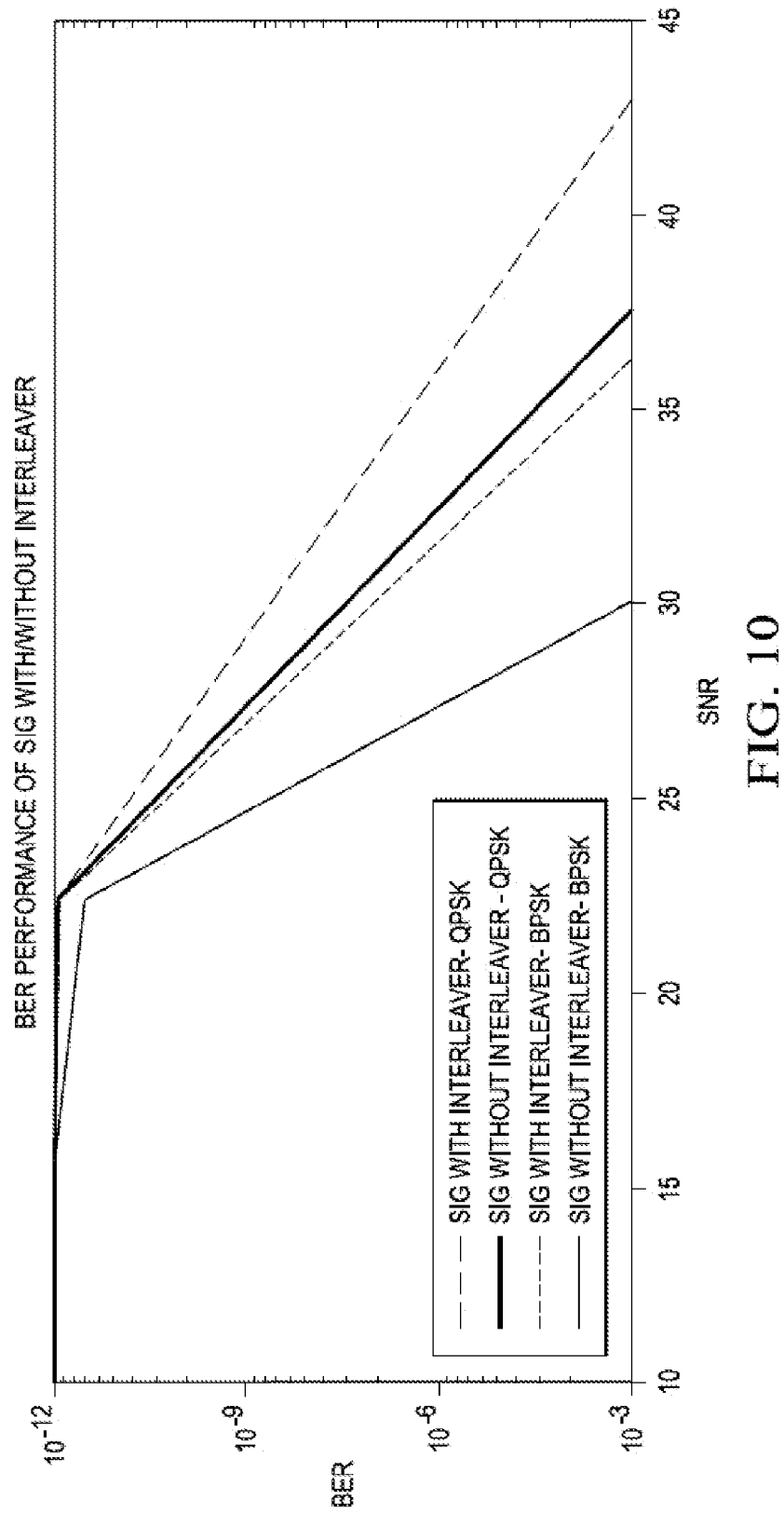
FIG. 10 illustrates a chart of yet additional simulation results.

FIG. 9 illustrates simulation results with the following simulation environment: BER per STA, no beamforming, no interleaver, one tab flat-fading channel is assumed, and perfect synchronization assumed. FIG. 10 illustrates simulation results with the following simulation environment: PER per STA, no beamforming, no interleaver, one tab flat-fading channel is assumed, and perfect synchronization assumed.

Figure 11:
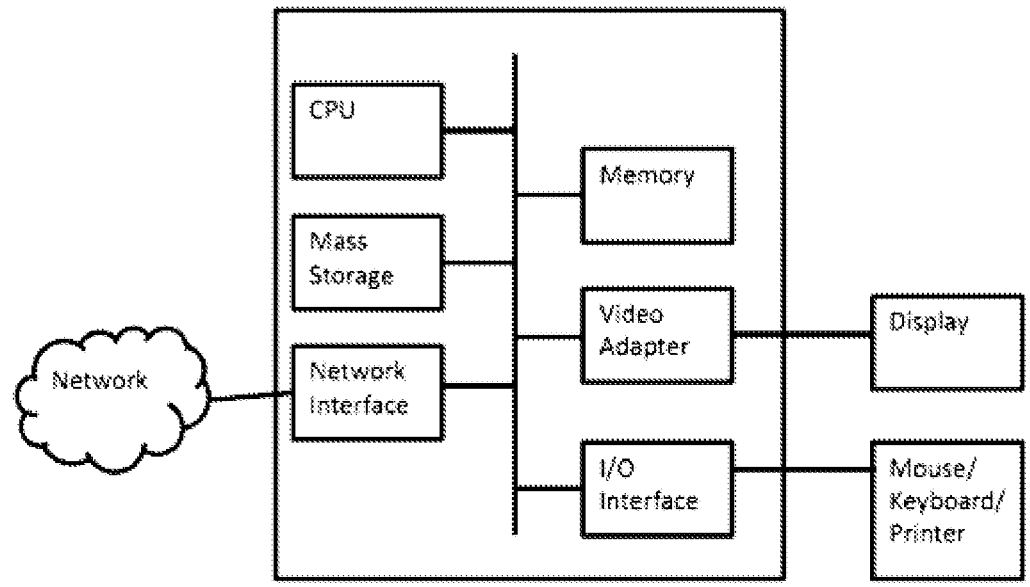
FIG. 11 illustrates a block diagram of an embodiment computing platform.

FIG. 11 is a block diagram of a processing system 1100 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not shown) may be used to provide a serial interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Figure 12:
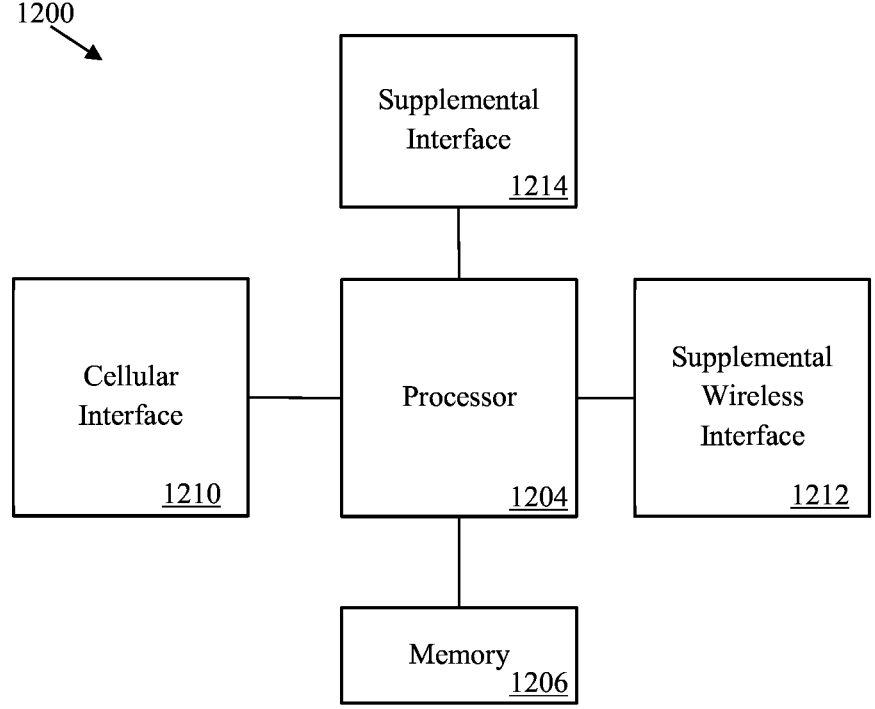
FIG. 12 illustrates a block diagram of an embodiment communications device.

FIG. 12 illustrates a block diagram of an embodiment of a communications device 1200, which may be equivalent to one or more devices (e.g., STAs, NBs, etc.) discussed above. The communications device 1200 may include a processor 1204, a memory 1206, a cellular interface 1210, a supplemental wireless interface 1212, and a supplemental interface 1214, which may (or may not) be arranged as shown in FIG. 12. The processor 1204 may be any component capable of performing computations and/or other processing related tasks, and the memory 1206 may be any component capable of storing programming and/or instructions for the processor 1204. The cellular interface 1210 may be any component or collection of components that allows the communications device 1200 to communicate using a cellular signal, and may be used to receive and/or transmit information over a cellular connection of a cellular network. The supplemental wireless interface 1212 may be any component or collection of components that allows the communications device 1200 to communicate via a non-cellular wireless protocol, such as a Wi-Fi or Bluetooth protocol, or a control protocol. The device 1200 may use the cellular interface 1210 and/or the supplemental wireless interface 1212 to communicate with any wirelessly enabled component, e.g., a base station, relay, mobile device, etc. The supplemental interface 1214 may be any component or collection of components that allows the communications device 1200 to communicate via a supplemental protocol, including wire-line protocols. In embodiments, the supplemental interface 1214 may allow the device 1200 to communicate with another component, such as a backhaul network component.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of transmitting a wireless signal, the method comprising:
   encoding data into a signal (SIG) field to obtain an encoded SIG field; and
   transmitting, by a transmitting device, a frame carrying the encoded SIG field without interleaving bits within the encoded SIG field, wherein at least some raw data carried within the frame is interleaved prior to the frame being transmitted.

2. The method of claim 1, further comprising:
   encoding data into a long training field (LTF) to obtain an encoded LTF, wherein the encoded LTF and the encoded SIG field are carried in a preamble of the frame, and wherein the frame is transmitted without interleaving bits within the encoded LTF.

3. The method of claim 1, wherein the frame is an Institute of Electrical and Electronics Engineers (IEEE) 802.11 ac frame.

4. The method of claim 1, wherein transmitting the encoded SIG field without interleaving bits within the encoded SIG field allows a receiver to perform channel equalization while contemporaneously decoding the frame.

5. The method of claim 1, wherein transmitting the encoded SIG field without interleaving bits within the encoded SIG field allows a receiver to perform non-linear channel equalization while contemporaneously decoding the frame.

6. The method of claim 1, wherein the raw data corresponds to data provided by a source.

7. A transmitter comprising:
   a processor; and
   a non-transitory computer readable storage medium storing programming for execution by the processor, the programming including instructions to:
      encode data into a signal (SIG) field to obtain an encoded SIG field; and
      transmit a frame carrying the encoded SIG field without interleaving bits within the encoded SIG field, wherein at least some raw data carried within the frame is interleaved prior to the frame being transmitted.

8. The transmitter of claim 7, wherein the programming further includes instructions to:
   encode data into a long training field (LTF) to obtain an encoded LTF wherein the encoded LTF and the encoded SIG field are carried in a preamble of the frame, and wherein the frame is transmitted without interleaving bits within the encoded LTF.

9. The transmitter of claim 7, wherein the frame is an Institute of Electrical and Electronics Engineers (IEEE) 802.11 ac frame.

10. The transmitter of claim 7, wherein transmitting the encoded SIG field without interleaving bits within the encoded SIG field allows a receiver to perform channel equalization while contemporaneously decoding the frame.

11. The transmitter of claim 7, wherein transmitting the encoded SIG field without interleaving bits within the encoded SIG field allows a receiver to perform non-linear channel equalization while contemporaneously decoding the frame.

12. The transmitter of claim 7, wherein the raw data corresponds to data provided by a source.

13. A method of receiving a wireless signal, the method comprising:
   receiving, by a receiving device, a frame comprising an encoded SIG field; and
   contemporaneously decoding the frame while performing channel equalization, the frame being decoded without de-interleaving bits within the encoded SIG field, wherein at least some encoded raw data carried within the frame is de-interleaved prior to decoding that encoded raw data.

14. The method of claim 13, wherein contemporaneously decoding the frame while performing channel equalization comprises performing non-linear channel equalization while decoding the frame.

15. The method of claim 13, wherein contemporaneously decoding the frame while performing channel equalization comprises performing maximum likelihood (ML) equalization while decoding the frame.

16. The method of claim 13, wherein the encoded SIG field is communicated within a preamble of the frame, and wherein the frame is an Institute of Electrical and Electronics Engineers (IEEE) 802.11 ac frame.

17. The method of claim 13, wherein the encoded raw data corresponds to data provided by a source.

18. A receiver comprising:
   a processor; and
   a non-transitory computer readable storage medium storing programming for execution by the processor, the programming including instructions to:

receive a frame comprising an encoded SIG field; and
contemporaneously decode the frame while performing channel equalization, the frame being decoded without de-interleaving bits within the encoded SIG field, wherein at least some encoded raw data carried within the frame is de-interleaved prior to decoding that encoded raw data.

19. The receiver of claim 18, wherein the instructions to contemporaneously decode the frame while performing channel equalization include instructions to perform non-linear channel equalization while decoding the frame.

20. The receiver of claim 18, wherein the instructions to perform channel equalization include instructions to contemporaneously decode the frame while performing maximum likelihood (ML) equalization while decoding the frame.

21. The receiver of claim 18, wherein the encoded SIG field is communicated within a preamble of the frame, and wherein the frame is an Institute of Electrical and Electronics Engineers (IEEE) 802.11 ac frame.

22. The receiver of claim 18, wherein the encoded raw data corresponds to data provided by a source.

\* \* \* \* \*